United States Patent [19]

Elms et al.

[11] 3,976,614

[45] Aug. 24, 1976

[54] INHERENTLY WATER-DISPERSIBLE, SELFCROSSLINKING INTERPOLYMERS USEFUL AS COATINGS

[75] Inventors: W. Jay Elms, Midland, Mich.; Dieter H. Klein, Achern, Germany

[73] Assignee: The Dow Chemical Company, Midland, Mich.

[22] Filed: Dec. 26, 1974

[21] Appl. No.: 536,491

Related U.S. Application Data

[63] Continuation-in-part of Ser. No. 417,309, March 10, 1969, abandoned.

[52] U.S. Cl. .................... 260/29.4 UA; 260/29.6 T; 260/29.6 TA; 260/856
[51] Int. Cl.$^2$.......................................... C08L 61/20
[58] Field of Search ............... 260/29.4 UA, 29.6 T, 260/856, 29.6 TA

[56] References Cited

UNITED STATES PATENTS

| | | | |
|---|---|---|---|
| 3,235,528 | 2/1966 | Lashua et al. | 260/31.2 R |
| 3,311,582 | 3/1967 | Sparks et al. | 260/29.4 UA |
| 3,361,696 | 1/1968 | Bolgiano et al. | 260/29.4 UA |
| 3,403,088 | 9/1968 | Hart | 260/29.4 UA |

*Primary Examiner*—Lorenzo B. Hayes
*Attorney, Agent, or Firm*—Raymond B. Ledlie; Michael S. Jenkins

[57] ABSTRACT

Aqueous dispersions of interpolymers containing a base monomer such as styrene or methyl methacrylate, an alkylene glycol monomer such as (tripropylene glycol methyl ether) acrylate and a,b-ethylenically unsaturated carboxylic acid such as acrylic acids are useful as low viscosity coating compositions which can be cured to water resistant coatings.

12 Claims, No Drawings

INHERRENTLY WATER-DISPERSIBLE, SELFCROSSLINKING INTERPOLYMERS USEFUL AS COATINGS

CROSS REFERENCE TO RELATED APPLICATIONS

This invention is a continuation-in-part of application Ser. No. 417,309 filed Mar. 10, 1969, now abandoned.

BACKGROUND OF THE INVENTION

This invention relates to inherently water-dispersible interpolymers containing alkylene glycol esters of unsaturated carboxylic acids as comonomer and to thermosetting coating compositions based thereon. Copolymers of various base monomer such as styrene, butadiene, ethyl acrylate, and/or methyl methacrylate with acrylic acid or methacrylic acid are known to be useful as the polymeric component in water-based coating compositions. For example, such copolymers containing from about 15 to 40 weight percent of the acid comonomer are insoluble in water but can be converted to water-soluble or at least water-dispersible materials by neutralization with ammonia or alkali metal hydroxide. These resulting aqueous coating or impregnating compositions are generally less expensive and pose a lower fire and health hazard than coating compositions of the copolymer dissolved or dispersed in organic solvents.

Unfortunately, the aqueous solutions or dispersions of these copolymers are relatively high in viscosity so that they frequently must be diluted considerably and excessively in order to adapt them to the most common coating procedures. In addition, the coatings obtained after drying and heating are generally sensitive to water and may sometimes be redispersed by treatment with water. However, when the proportion of the acid comonomer in the copolymer is reduced to below 10 weight percent in order to reduce the water sensitivity of the coatings resulting therefrom, the neutralized copolymers are either not water-dispersible or require substantial amounts of added surfactant to disperse them in water. These added surfactants often deleteriously affect the physical properties of the resulting coating.

In view of the aforementioned deficiencies of the prior art copolymers, it would be highly desirable to provide a copolymer which is readily dispersed in water without the aid of added surfactant to provide a low viscosity aqueous solution of dispersion of the copolymer and which, when applied as a coating to a variety of substrates, adheres thereto and cures to a water-resistant coating.

SUMMARY OF THE INVENTION

In accordance with the present invention, low viscosity aqueous dispersions of interpolymers are prepared without the aid of added surfactants by utilizing an interpolymer of up to about 40 mole percent of a monovinylidene aromatic comonomer, up to about 70 mole percent of an alkyl ester of an $\alpha,\beta$-ethylenically unsaturated carboxylic acid, from about 3 to 80 mole percent of an alkylene glycol ester or an alkylene glycol ether ester of olefinically unsaturated monocarboxylic acid and/or an alkylene glycol ether of an ethylenically unsaturated alcohol, hereinafter referred to as an alkylene glycol monomer, from about 2 to about 20 mole percent of an $\alpha,\beta$-ethylenically unsaturated carboxylic acid, and, optionally, up to about 50 mole percent of a hydroxyalkyl ester of an $\alpha,\beta$-ethylenically unsaturated carboxylic acid and up to about 24 mole percent of another $\alpha,\beta$-ethylenically unsaturated monnomer. The interpolymers of the present invention are at least inherently water-dispersible. By "inherently water-dispersible" is meant capability of forming a colloidal dispersion in water in the absence of chemical dispersing aids such as surfactants, emulsifying agents and the like. For the purposes of this invention, the term "aqueous dispersion" shall include dispersions of colloidal size interpolymer particles and solutions of the interpolymers.

It is believed that the alkylene glycol moiety of the interpolymer performs as a surfactant and thereby contributes to the water dispersibility characteristic of the interpolymer. Surprisingly, this same moiety enables the interpolymer to selfcrosslink when heated under oxidative conditions, preferably in the presence of an oxidative metal catalyst such as cobalt naphthenate thereby losing its water sensitivity. Accordingly, aqueous dispersions of the foregoing interpolymer are useful as coating compositions for a wide variety of substrates and cure with the aid of catalysts to form water resistant coatings. In addition, the foregoing interpolymers may be combined with a wide variety of glycol-curable thermosetting materials such as polyepoxide compounds and melamine resins to produce thermoset coatings having excellent stain resistance, good flexibility, excellent resistance to the deleterious effects of mild aqueous detergent solutions on prolonged contact, and good impact resistance. The coating compositions of the present invention have utility in metal decorating, printing inks, general industrial enamels, coil coatings and appliance finishes.

DETAILED DESCRIPTION OF THE PREFERRED EMBODIMENTS

Preferred interpolymers of the present invention contain from 5 to about 40 mole percent of monovinylidene aromatic comonomer, especially from about 20 to about 37 mole percent; from about 10 to about 70 mole percent of ester of $\alpha,\beta$-ethylenically unsaturated carboxylic acid, especially from about 20 to about 40 mole percent; from about 3 to about 80 mole percent of alkylene glycol monomer, especially from about 10 to about 30 mole percent; from about 2 to about 20 percent of $\alpha,\beta$-ethylenically unsaturated carboxylic acid, especially from about 3 to about 8 mole percent; from 0 to about 50 mole percent of hydroxyalkyl ester of $\alpha,\beta$-ethylenically unsaturated carboxylic acid, especially from about 15 to about 25 mole percent and from 0 up to about 24 mole percent of another $\alpha,\beta$-ethylenically unsaturated monomer especially from about 0 to about 16 mole percent. In order to be inherently water-dispersible the interpolymers of the present invention have molecular weights in the range from about 3,000 to about 100,000, preferably from about 15,000 to about 40,000. Representative monovinylidene aromatic comonomers which are suitable for the purposes of this invention include sytrene, $\alpha$-methyl styrene, ar-methyl styrene, ar-chloro styrene, ar-bromo styrene, ar-(t-butyl)styrene, $\alpha$-methyl-ar-methyl styrene, ar-methoxy styrene, vinyl naphthalene and mixtures thereof.

Representative esters of $\alpha,\beta$-ethylenically unsaturated carboxylic acids include methyl acrylate, ethyl acrylate, methyl methacrylate, butyl acrylate, and other lower alkyl esters of α,β-ethylenically unsaturated carboxylic acids such as acrylic acid, methacrylic acid, itaconic acid, fumaric acid, maleic acid and anhydride, citraconic acid and aconitic acid.

The alkylene glycol monomer suitably includes the alkylene glycol esters and alkylene glycol ether esters of α,β-ethylenically unsaturated monocarboxylic acids, alkylene glycol ethers of α,β-ethylenically unsaturated alcohols, and mixtures thereof.

Representative alkylene glycol ether esters of ethylenically unsaturated monocarboxylic acids are the monoalkyl, monoaryl, and monoalkaryl ether esters which can be prepared by directly esterifying the ethylenically unsaturated carboxylic acid with alkylene glycol alkyl, aryl, or alkaryl ethers in the presence of sulfuric acid as a catalyst and which are copolymerizable with the foregoing monomers. Suitable alkylene glycol esters may be prepared by the reaction of alkylene oxides with hydroxyalkyl esters of α,β-ethylenically unsaturated monocarboxylic acids. Exemplary ether esters include the monoacrylates and monomethacrylates of alkylene glycol alkyl or cycloalkyl ethers, alkylene glycol aryl or alkaryl ethers wherein alkyl is methyl, ethyl, n-propyl, isopropyl, n-butyl, iso-butyl, t-butyl, 2-ethylbutyl, 2-ethylhexyl, and the like; cycloalkyl is cyclohexyl, cyclopentyl, cycloheptyl and the like: aryl is phenyl, biphenyl, naphthyl and the like; and alkaryl is benzyl, n-butylphenyl and the like and wherein alkylene glycol inclusive of polyalkylene glycol is ethylene glycol including polyethylene glycols having 2 to 10 ethyleneoxy units, propylene glycols including polypropylene glycols have 2 to 10 propyleneoxy units, and other alkylene glycols including polyalkylene glycols having 2 to 10 alkylene groups in the straight chain and having an alkyl, aryl, or alkaryl radical in continuous, branched, cyclic or phenylene configuration. Example of such alkylene glycol esters and alkylene glycol ether esters of acrylic or methacrylic acids are adducts of hydroxyethyl acrylate and three propylene oxides, (dipropylene glycol methyl ether) acrylate, (dipropylene glycol ethyl ether) acrylate, adduct of hydroxyethyl acrylate and three butylene oxides, (dipropylene glycol n-butyl ether) acrylate, (diethylene glycol methyl ether) acrylate, (diethylene glycol ethyl ether) acrylate, (ripropylene glycol methyl ether) acrylate, (tripropylene glycol ethyl ether) acrylate, (tripropylene glycol n-butyl ether) acrylate, (diethylene glycol methyl ether) methacrylate, (diethylene glycol ethyl ether) methacrylate, (diethylene glycol n-butyl ether) methacrylate, (tripropylene glycol methyl ether) methacrylate, (tripropylene glycol ethyl ether) methacrylate, (tripropylene glycol n-butyl ether) methacrylate; di-, tetra-, penta- and decamethylene glycol monoalkyl ether esters of methacrylic acid wherein the alkyl substituent group contains from 1 to 6 carbon atoms, mixtures thereof, and other disclosed in U.S. Pat. No. 3,235,528 to Lashua et al. Of the foregoing alkylene glycol esters and alkylene glycol ether esters, (tripropylene glycol methyl ether) acrylate and (tripropylene glycol ethyl ether) acrylate are preferred.

Representative alkylene glycol ethers of unsaturated alcohols include tripropylene glycol vinyl ether, tripropylene glycol vinyl benzyl ether and other copolymerizable alkylene glycol ethers of α,β-ethylenically unsaturated alkenols and α,β-ethylenically unsaturated alkenylphenols and arylalkenols.

Representative α,β-ethylenically unsaturated carboxylic acids which are suitably copolymerized with the foregoing monomers include acrylic acid, methacrylic acid, itaconic acid, fumaric acid, maleic acid and anhydride, citraconic acid, aconitic acid. Of the foregoing, acrylic acid and methacrylic acid are preferred.

In instances wherein it is desirable to use the interpolymers in combination with a melamine resin, polymerizable urethane compositions, or other active hydrogen initiated polymerization materials, it is desirable to employ a hydroxyalkyl ester of an α,β-ethylenically unsaturated carboxylic acid as described hereinbefore. Preferred hydroxyalkyl esters are hydroxyethyl acrylate and hydroxypropyl acrylate.

Other α,β-ethylenically unsaturated monomers suitably employed in the interpolymers include the amides such as acrylamide, methacrylamide and fumaramide; nitriles such as acrylonitrile and methacrylonitrile; halides such as vinyl chloride, vinyl bromide and vinylidene chloride; vinyl esters such as vinyl acetate and vinyl benzoate; ethers and ketones such as ethyl vinyl ether and methyl vinyl ketone and the like. Preferred are the amides such as acrylamide.

The interpolymers of the invention can be prepared by interpolymerizing a mixture of at least one of the alkylene glycol monomers, the α,β-ethylenically unsaturated carboxylic acid and a remaining amount of base monomer which may include hydroxyalkyl ester of an ethylenically unsaturated carboxylic acid and/or another ethylenically unsaturated monomer or monomers in an organic solvent medium in the presence of a free-radical type catalyst under an oxygen-free atmosphere. The monomeric constituents are admixed and interpolymerized in the proportions set forth hereinbefore.

Exemplary solvents include the lower alkanols such as ethanol, propanol, and butanol; aromatic hydrocarbons such as toluene, benzene and xylene; halohydrocarbons such as methylene chloride, tetrachloroethane and the like; and others such as butyl acetate and butoxyethyl acetate.

Free-radical type catalysts are preferably the oxygen-free varieties such as the azo catalysts, e.g., azobisisobutyronitrile. Use of peroxygen catalyst is less desirable because the resulting polymers have viscosities much higher than those prepared using oxygen-free catalysts. The catalyst is preferably employed in an amount from about 0.1 to about 2 weight percent based on the weight of the monomers.

Often, it may be necessary to employ a chain regulator in order to provide a molecular weight in the range desired. Examples of chain regulators that may be employed include long chained alkyl mercaptans, e.g., t-dodecyl mercaptan of the formula:

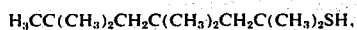

short chained alkyl mercaptans such as butyl mercaptan and 2-hydroxyethyl mercaptan, isopropanol, isobutanol, long chained alcohols, e.g., lauryl alcohol, octyl alcohol, cumene, carbon tetrachloride, tetrachloroethylene, and trichlorobromomethane. The amount of chain regulator the may be employed depends on the particular system and the conditions and may vary from 0 to about 5 weight percent based on monomer weight. Illustratively, the use of from 0 to about 1 weight percent of t-dodecyl mercaptan serves to provide as wide a range of molecular weight in aqueous media as is desirable.

Essentially complete conversion of the reacted monomers to the desired interpolymer can be accomplished in a period of about 6 to about 10 hours at temperatures within the range from about 50° to about 150°C under atmospheric or superatmospheric pressure.

Following the preparation of the interpolymers in the organic solvent medium, the organic solvent can be driven off, and water is then added to provide the desired aqueous dispersion or solution.

Prior to use, additional additives are optionally included in the foregoing interpolymer compositions. For example, fillers, pigments, stabilizers and the like such as carbon blacks; titanium dioxide, clay, talc, calcium carbonate, barium sulfate, etc., may be included. The resulting interpolymer compositions may thus be employed for coating and impregnating paper, leather, wood, metals, glass, ceramics, concrete and all sorts of textiles. In addition, they are useful for the bonding of fibers in nonwoven fabrics and as backing material for rugs. In the uses mentioned hereinbefore, aqueous solutions may be employed for the purpose of producing clear, transparent products. On the other hand some of the aforementioned pigments, dyes and fillers may be incorporated in conventional amounts to impart any desired color or delustered effect that may be desired.

The aqueous dispersions of the foregoing interpolymers, even at polymer solids concentrations from about 30 to about 47 weight percent, generally have low viscosities, i.e., viscosities generally below 2,000 centipoise at 25°C using a No. 2 Spindle at 20 rpm. Increase of the concentration beyond this point increases the viscosity. The aqueous dispersions of the interpolymers at viscosities suitable for use in spray coating have adequate concentrations to enable deposition of a coating of substantial thickness, e.g., on the order of 0.5 to 2 mils in a single spraying. The composition can be applied at any polymer solids concentration from about 10 percent up to about 50 percent by weight depending on the particular purpose, the extent of penetration desired when absorbent or porous surfaces are involved, and the thickness of the coating desired in a particular instance.

The resulting coatings containing an oxidative metal catalyst such as cobalt naphthenate are preferably cured to solvent- and water-resistant coatings by heating the coating at elevated temperatures in the range from about 125° to about 200°C to effect selfcrosslinking of the alkylene glycol moiety of the interpolymer. Such oxidative metal catalysts are normally employed in concentrations from about 0.01 to about 0.5 weight percent based on the interpolymer. It also has been found that such interpolymer coatings containing no oxidative metal catalyst can be cured to solvent- and water-resistant coatings by heating them in air at temperatures from about 160° to about 200°C.

Alternatively, the interpolymers of this invention are advantageously combined with thermosetting materials capable of crosslinking with polyols such as polyepoxide compounds or melamine resins and cured to coatings or articles having excellent toughness and resistance to solvents. Illustratively, a thermosetting composition containing the interpolymer in amount from about 7 to about 30 weight percent based on total polymer solids is subjected to curing temperatures in the range from about 125° to about 175°C for a suitable period, usually from about 10 to about 30 minutes. It is often preferred to accelerate the rate of curing and/or reduce curing temperatures by including an acid catalyst such as p-toluene sulfonic acid, usually in concentration of about 0.1 weight percent based on total polymer solids.

The following examples are given to illustrate the present invention. All parts and percentages are by weight unless otherwise indicated.

EXAMPLE 1

To a 5-liter resin kettle equipped with a condenser, thermometer, stirrer, monomer reservoir, metering pump and heating bath is added 2000 parts of n-butanol. The kettle is purged with nitrogen, stirred and heated to 100°C and a monomer initiator feed of the following ingredients:

| Ingredient | Parts |
|---|---|
| Hydroxypropyl acrylate | 340 |
| (Tripropylene glycol methyl ether) acrylate (TPMA) | 600 |
| Butyl acrylate | 600 |
| Styrene | 400 |
| Acrylic acid | 60 |
| Azobisisobutyronitrile | 20 |
| t-Dodecyl mercaptan | 15 | is added over a period of 3 hours. After completion of the feed, the resulting mixture is stirred and maintained at 100°C until the solids content of the reaction mixture is 48–50%. An additional two parts of azobisisobutyronitrile is added to the reaction mixture to push conversion toward completion. After the reaction is completed, the n-butanol is removed under vacuum at 100°C and 54 parts of dimethylaminoethanol is added. Following homogeneous incorporation of the dimethylaminoethanol into the reaction mixture, 2815 parts of deionized water is added over a period of 10 minutes after which the reaction mixture is stirred for a total of 3 hours until the product reaches a viscosity of 1,000 to 2,000 cps at 25°C, No. 2 Spindle and 20 rpm. The resultant product is an aqueous dispersion of styrene/butyl acrylate/TPMA/hydroxypropyl acrylate/acrylic acid interpolymer having an average particle size of approximately 500 A.

The foregoing aqueous dispersion of interpolymer is blended with methoxymethyl melamine resin (Uformite MM-83 from Rohm & Haas) at a ratio of 70/30 based on total solids. A portion of the resultant blend is stored for a substantial period of time to observe shelf stability. The remaining portion is applied at 30–40% solids to a steel substrate (which has been pretreated with iron phosphate) to form a film having a thickness of 1–2 mils which is baked at 250°F for 30 minutes. The resultant film is tested for water resistance, solvent resistance, mar resistance, Sward hardness, impact strength and adhesion. The results are reported in Table I.

For the purposes of comparison, a conventional aqueous dispersion of acrylic polymer (Sample No. 2) is blended with the methoxy melamine resin in the same ratio as the foregoing interpolymer and similarly tested for shelf stability and film properties. These results are also recorded in the following Table I.

TABLE I

|  | Sample No. 1 | Sample No. 2* |
|---|---|---|
| Acrylic polymer(1) |  |  |
| Type | HPA/TPMA/S/BA/AA | HEA/MMA/BA/AA |
| Monomer Content, |  |  |
| Weight Percent | 17/30/20/30/3 | 33/33/31/3 |
| ~Mole Percent | 17.9/16.5/26.3/32.1/5.7 | 28.7/37.9/24.5/4.2 |
| Shelf Stability | Several Months | <2 days |
| Water Resistance(2) | Good | Good |
| Solvent Resistance(3) | Very Good | Excellent |
| Sward Hardness(4) | 48 | <45 |
| Impact Resistance(5) |  |  |
| Reverse | 80 | <5 |
| Direct | 100 | 30 |
| Adhesion(6) | Excellent | Excellent |

*Not an example of the invention.
(1)HPA - hydroxypropyl acrylate, TPMA - (tripropylene glycol methyl ether) acrylate, S - styrene, BA - butyl acrylate, AA - acrylic acid, HEA - hydroxyethyl acrylate, MMA - methyl methacrylate.
(2)Pretreated steel panels are coated with a No. 12 wire rod, baked at 250°F for 0.5 hours and then immersed for 3 hours in water at 80°C. Coatings are checked for adhesion and blushing. A rating of good indicates no blushing or loss of adhesion.
(3)A cloth, soaked with methyl ethyl ketone, is rubbed with slight pressure on the coating surface. The rubbed surface is checked for mar. A rating of excellent indicates no change in film appearance after 100 double rubs with the cloth, and a rating of very good indicates no mar, but possible film softening after 100 double rubs.
(4)Determined with Sward Rocker wherein Sward hardness value is hardness as compared to glass with glass hardness being taken as 100.
(5)Polymer coating applied to bonderized 1000 steel panels which are placed at a base of a Gardner Impact Tester. Reverse and direct impact are then determined.
(6)The polymer coating on a glass substrate is deeply scribed with a razor blade in the shape of a A. This figure is made one inch high and one-half inch wide at the base. A piece of ordinary cellophane adhesive tape is pressed over the entire scribed surface with a hard rubber eraser. The tape is removed by pulling rapidly and evenly towards the bottom of the test substrate. A rating of excellent indicates no loss of adhesion.

As evidenced by the foregoing data of Table I, the interpolymer of the present invention exhibits longer shelf life, (i.e., retains lower viscosities over a longer period of time) and higher impact strength than the conventional acrylate polymers do.

EXAMPLE 2

Following the procedure of Example 1 several additional interpolymers are prepared and tested for viscosity. The results are recorded in the following Table II.

EXAMPLE 3

Following the procedure of Example 1, several interpolymers are prepared wherein different alkylene glycol monomers are employed. The resulting interpolymers are then converted to aqueous dispersions, applied as coatings, cured and tested as in Example 1. The results of these tests are recorded in Table III.

TABLE II

| Sample No. | Interpolymer(1) Monomer | Wt. % | % Solids | Viscosity(2), cps |
|---|---|---|---|---|
| 1 | TPMA/HPA/AA | 80/15/5 | 57 | 1840 |
| 2 | TPMA/BA/HPA/AA | 77/5/15/3 | 57 | 7000 |
| 3 | TMPA/BA/S/HPA/AA | 43/20/20/15/2 | 42 | 180 |
| 4 | TPMA/EA/S/HPA/AA | 32/30/20/15/3 | 38 | 630 |
| 5 | TPMA/BA/S/HPA/AA | 32/30/20/15/3 | 38 | 900 |
| 6 | TPMA/BA/S/HPA/AA | 25/30/20/22/3 | 41 | 900 |

(1)Abbreviations are same as (1) in Table I and BA = ethyl acrylate.
(2)Viscosity in centipoise at 25°C using No. 2 spindle at 20 rpm.

TABLE III

| Sample No. | Interpolymer Monomer(1) | Wt. % | Water Resistance(2) | Solvent Resistance(3) | Impact Resistance(5) Direct | Reverse |
|---|---|---|---|---|---|---|
| 1 | HPA/TPMVBE/BA/S/AA | 22/25/25/25/3 | Excellent | Excellent | 80 | 60 |
| 2 | HPA/HEA-3PO/BA/S/AA | 9.5/26/35.5/25/3 | Exellent | Very good | 160 | 160 |
| 3 | HPA/HEA-3BO/BA/S/AA | 9.5/32/30.5/25/3 | Slight blush | Slight film softening | 160 | 160 |
| 4 | HPA/DMA/BA/S/AA | 22/25/25/25/3 | Very good | Very good | 160 | 160 |
| 5 | HPA/DPMA/BA/S/AA | 22/25/25/25/3 | Very good | Very good | 140 | 140 |

(1)Same as (1) in Table I plus TPMVBE - tripropylene glycol methyl vinylbenzyl ether, HEA-3PO - adduct of hydroxyethyl acrylate and 3 propylene oxides $(H \!+\! OC_3H_7] \!-\! OC_2H_4O \!-\! \overset{O}{\overset{\|}{C}} \!-\! CH\!=\!CH_2)$, HEA-3BO - adduct of hydroxyethyl acrylate and 3 butylene oxides, DMA - diethylene glycol methyl acrylate, DPMA - (dipropylene glycol methyl ether) acrylate.
(2)Same as (1) in Table I except that the panels are immersed in boiling water.
(3)Same as (3) in Table I.
(4)Same as (4) in Table I.

EXAMPLE 4

As evidence of the selfcrosslinking characteristics (oxidative cure) of these interpolymers, sufficient cobalt naphthenate is added to a portion of TPMA/hydroxypropyl acrylate/acrylic acid (80/15/5) interpolymer to provide 0.06 percent cobalt based on polymer solids. The resulting compositions are baked at temperatures of ~125° and ~160°C for 30 minutes and tested as indicated in Table IV.

Also, coatings of the same interpolymer containing no cobalt naphthenate are heated in air at temperatures of ~125° and ~160°C for 30 minutes and tested as indicated in Table IV.

TABLE IV

| Sample No. | 1 | 2 | 3 | 4 |
|---|---|---|---|---|
| Cure Conditions | 125°C with cobalt | 160°C with cobalt | 125°C, no cobalt | 160°C, no cobalt |
| Water Resistance(2) | Slight film softening but no blushing | Good, no softening no blushing | Film blushing, film softening | Film softening, but no blushing |
| Solvent Resistance(3) | Poor | Good | Failure | Fair |
| Sward Hardness(4) | 4 | 30 | Tacky | 10 |

(2)Same as in Table I.
(3)Same as in Table I with Fair indicating marring of the coating after 50 double rubs and Poor indicating marring of the coating after 10 double rubs.
(4)Same as in Table I.

EXAMPLE 5

Following the procedure of Example 1, an interpolymer is prepared wherein acrylamide is employed as an additional ethylenically unsaturated monomer in the following monomer formulation:

| Monomers(1) | Wt. % | Mole % |
|---|---|---|
| HEA | 5 | 6 |
| TPMA | 50 | 26.9 |
| S | 30 | 45.6 |
| AA | 3 | 5.8 |
| AAM | 8 | 15.7 |

(1)Abbreviations are same as (1) in Table I and HEA = hydroxylethyl acrylate and AAM = acrylamide.

The pH of the resultant aqueous dispersion of interpolymer is increased to 9. An amount formaldehyde stoichiometrically equivalent to the amount of acrylamide in the interpolymer is added to the aqueous dispersion. The resulting composition is applied as a coating to a hard substrate and cured at 60°–90°C for 30–60 minutes to form a glossy coating having solvent resistance.

What is claimed is:

1. An aqueous dispersion of an interpolymer of up to about 40 mole percent of a monovinylidene aromatic monomer, up to about 70 mole percent of an alkyl ester of an α,β-ethylenically unsaturated carboxylic acid, from about 3 to about 80 mole percent of an alkylene glycol monomer selected from the group consisting of an adduct of hydroxyethyl acrylate and three propylene oxides, an adduct of hydroxyethyl acrylate and three butylene oxides, alkylene glycol ether esters of α, β-ethylenically unsaturated monocarboxylic acids and alkylene glycol ethers of ethylenically unsaturated alcohols, from about 2 to about 15 mole percent of an α,β-ethylenically unsaturated carboxylic acid, up to about 50 mole percent of a hydroxyalkyl ester of an α,β-ethylenically unsaturated carboxylic acid and up to about 24 mole percent of another α,β-ethylenically unsaturated monomer, said interpolymer having a molecular weight in the range from about 3,000 to about 100,000, said dispersion being curable under oxidative conditions to form a water-resistant coating.

2. The aqueous dispersion of claim 1 wherein the alkylene glycol monomer is (tripropylene glycol methyl ether) acrylate.

3. The aqueous dispersion of claim 1 wherein the aqueous dispersion contains from about 10 to about 50 weight percent of the interpolymer of from about 5 to about 40 mole percent of the monovinylidene aromatic monomer, from about 10 to about 70 mole percent of the alkyl ester, from about 10 to about 30 mole percent of the alkylene glycol ether ester, from about 3 to about 8 mole percent of the acid from about 15 to 25 mole percent of the hydroxyalkyl ester, and from 0 to about 16 mole percent of an α,β-ethylenically unsaturated amide.

4. A curable composition comprising the aqueous dispersion of claim 1 and a thermosetting resin capable of crosslinking with polyols.

5. The composition of claim 2 wherein the thermosetting resin is a malamine resin.

6. A curable composition comprising the aqueous dispersion of claim 1 and an amount of oxidative catalyst sufficient to effect selfcrosslinking of the interpolymer.

7. The curable composition of claim 6 wherein the catalyst is cobalt naphthenate.

8. An aqueous dispersion of from 10 to 50 weight percent of an interpolymer of from 20 to 37 of a monovinylidene aromatic monomer, from 20 to 40 mole percent of an alkyl ester of an α,β-ethylenically unsaturated carboxylic acid, from 3 to 8 mole percent of α,β-ethylenically unsaturated carboxylic acid, from 15 to 25 mole percent of a hydroxyalkyl ester of α,β-ethylenically unsaturated carboxylic acid, from 10 to 30 mole percent of an adduct of hydroxyethyl acrylate and three propylene oxides, an adduct of hydroxyethyl acrylate and three butylene oxides, an alkylene glycol ether ester of α,β-ethylenically unsaturated monocarboxylic acid or an alkylene glycol ether of an ethylenically unsaturated alcohol, and from 0 to about 16 mole percent of an α,β-ethylenically unsaturated amide, the interpolymer having a molecular weight in the range from 15,000 to 40,000.

9. A curable composition comprising cobalt naphthanate and the aqueous dispersion of claim 8.

10. A curable composition comprising the aqueous dispersion of claim 8 and a thermosetting resin capable of crosslinking with polyols, said interpolymer constituting from about 7 to about 30 weight percent based on total polymer solids.

11. The aqueous dispersion of claim 8 wherein the monovinylidene aromatic monomer is selected from the group consisting of styrene, α-methyl styrene, ar-methyl styrene, ar-chloro styrene, ar-bromo styrene, ar-(t-butyl)styrene, α-methyl-ar-methyl styrene, ar-methoxy styrene, vinyl naphthalene and mixtures thereof; the ester of α,β-ethylenically unsaturated carboxylic acid is selected from the group consisting of methyl methacrylate, ethyl acrylate, methyl acrylate, butyl acrylate and other lower alkyl esters of an acid selected from the group consisting of acrylic, methacrylic, itaconic, fumaric, maleic, citraconic and aconitic; the alkylene glycol monomer is selected from the group consisting of hydroxyethyl acrylate and three propylene oxides, (dipropylene glycol methyl ether) acrylate, (dipropylene glycol ethyl ether) acrylate, adduct of hydroxyethyl acrylate and three butylene oxides, (dipropylene glycol n-butyl ether) acrylate, (diethylene glycol methyl ether) acrylate, (diethylene glycol ethyl ether) acrylate, (tripropylene glycol methyl ether) acrylate, (tripropylene glycol ethyl ether) acrylate, (tripropylene glycol n-butyl ether) acrylate, (diethylene glycol methyl ether) methacrylate, (diethylene glycol ethyl ether) methacrylate, (diethylene glycol n-butyl ether) methacrylate, (tripropylene glycol methyl ether) methacrylate, (tripropylene glycol ethyl ether) methacrylate, (tripropylene glycol n-butyl ether) methacrylate; di-, tetra-, penta- and decamethylene glycol monoalkyl ether esters of methacrylic acid wherein the alkyl substituent group contains from 1 to 6 carbon atoms, mixtures thereof, tripropylene glycol vinyl ether and tripropylene glycol vinyl benzyl ether; the α,β-ethylenically unsaturated is selected from the group consisting of acrylic acid, methacrylic acid, itaconic acid, fumaric acid, maleic acid and anhydride, citraconic acid, aconitic acid, the hydroxyalkyl ester is selected from the group consisting of hydroxyethyl acrylate and hydroxypropyl acrylate and the amide is selected from the group consisting of acrylamide, methacrylamide and fumamide.

12. The aqueous dispersion of claim 8 wherein the aromatic monomer is styrene, the ester is butyl acrylate, the glycol monomer is (tripropylene glycol methyl ether) acrylate, the acid is acrylic acid, the hydroxyalkyl ester is hydroxyethyl acrylate and the amide is acrylamide.

* * * * *